United States Patent
Yu

(10) Patent No.: US 11,983,917 B2
(45) Date of Patent: May 14, 2024

(54) BOOSTING AI IDENTIFICATION LEARNING

(71) Applicant: Huawei Technologies Co., Ltd., Shenzhen (CN)

(72) Inventor: Jiangsheng Yu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 544 days.

(21) Appl. No.: 17/221,394

(22) Filed: Apr. 2, 2021

(65) Prior Publication Data

US 2021/0224611 A1    Jul. 22, 2021

Related U.S. Application Data

(63) Continuation of application No. PCT/CN2019/110084, filed on Oct. 9, 2019.
(Continued)

(51) Int. Cl.
*G06V 10/00* (2022.01)
*G06F 18/214* (2023.01)
(Continued)

(52) U.S. Cl.
CPC .......... *G06V 10/764* (2022.01); *G06F 18/214* (2023.01); *G06F 18/24* (2023.01);
(Continued)

(58) Field of Classification Search
CPC ........ G06N 20/00; G06N 3/08; G06N 3/0454; G06N 3/82; G06F 18/24; G06F 18/214;
(Continued)

(56) References Cited

U.S. PATENT DOCUMENTS 8,306,940 B2 * 11/2012 Lee .................. G06N 20/00
706/61
9,069,737 B1 * 6/2015 Kimotho ............ G06F 11/079
(Continued)

FOREIGN PATENT DOCUMENTS

CN    104508671 A    4/2015
CN    104966105 A    10/2015
(Continued)

OTHER PUBLICATIONS

"International Application No. PCT/CN2019/110084, International Search Report dated Aug. 1, 2020", (Jan. 8, 2020), 3 pgs.
(Continued)

*Primary Examiner* — Amir Alavi
(74) *Attorney, Agent, or Firm* — Schwegman Lundberg & Woessner, P.A.

(57) ABSTRACT

A machine-learning classification system includes a first machine-learning classifier that classifies each element of a plurality of data items to generate a plurality of classified data items. A second machine-learning classifier identifies misclassified elements of the plurality of classified data items and reclassifies each of the identified misclassified elements to generate a plurality of reclassified data items. A second machine-learning classifier identifies unclassified elements of the plurality of classified data items and classifies each of the identified unclassified elements to generate a plurality of reclassified data items. An ensemble classifier adjusts the classifications of the elements of the plurality of classified data items in response to the plurality of reclassified data items and the plurality of newly-classified elements.

17 Claims, 8 Drawing Sheets

Related U.S. Application Data

(60) Provisional application No. 62/745,853, filed on Oct. 15, 2018.

(51) Int. Cl.

| | | |
|---|---|---|
| *G06F 18/24* | (2023.01) |
| *G06N 20/00* | (2019.01) |
| *G06V 10/764* | (2022.01) |
| *G06V 10/774* | (2022.01) |
| *G06V 10/82* | (2022.01) |
| *G06V 40/16* | (2022.01) |

(52) U.S. Cl.
CPC ......... *G06N 20/00* (2019.01); *G06V 10/7753* (2022.01); *G06V 10/82* (2022.01); *G06V 40/172* (2022.01)

(58) Field of Classification Search
CPC .. G06F 18/241; G06F 18/2413; G06F 18/243; G06V 10/764; G06V 10/82; G06V 10/7753; G06V 10/70; G06V 10/774; G06V 10/191; G06V 40/172; G06T 2207/20081
See application file for complete search history.

(56) References Cited

U.S. PATENT DOCUMENTS

| | | | |
|---|---|---|---|
| 9,235,562 B1* | 1/2016 | Hart | G06F 18/211 |
| 9,483,741 B2* | 11/2016 | Sun | G06F 18/254 |
| 10,102,418 B2* | 10/2018 | Bredno | A61B 17/3423 |
| 10,558,921 B2* | 2/2020 | Jayaraman | G06F 16/285 |
| 10,943,186 B2* | 3/2021 | Guo | G06N 20/00 |
| 11,210,397 B1* | 12/2021 | Sharif | G06F 21/566 |
| 11,514,364 B2* | 11/2022 | Elisha | G06Q 30/016 |
| 11,636,387 B2* | 4/2023 | Elisha | G06N 20/00 |
| | | | 706/14 |
| 11,636,389 B2* | 4/2023 | Elisha | G06N 20/00 |
| | | | 706/12 |
| 2014/0241618 A1 | 8/2014 | Simske et al. | |
| 2015/0269857 A1* | 9/2015 | Feng | G09B 7/00 |
| | | | 434/353 |
| 2017/0262981 A1 | 9/2017 | Gulsun et al. | |
| 2018/0101791 A1 | 4/2018 | Viswanathan | |

FOREIGN PATENT DOCUMENTS

| | | |
|---|---|---|
| CN | 105956631 A | 9/2016 |
| EP | 2874102 A2 | 5/2015 |
| WO | WO-2020078235 A1 | 4/2020 |

OTHER PUBLICATIONS

"International Application No. PCT/CN2019/110084, Written Opinion dated Jan. 8, 2020", (Jan. 8, 2020), 4 pgs.

"Chinese Application 201980068228.5, Office Action dated Jul. 21, 2023", (Jul. 21, 2023), 6 pgs.

\* cited by examiner

BOOSTING AI IDENTIFICATION LEARNING

CROSS-REFERENCE TO RELATED APPLICATIONS

This application is a continuation application of International Application No. PCT/CN2019/110084, filed Oct. 9, 2019, which claims the benefit of priority to U.S. Provisional Application No. 62/745,853, filed on Oct. 15, 2018, entitled "Boosting AI Identification Learning," the benefit of priority of each of which is claimed herein, and which applications and publication are hereby incorporated herein by reference in their entirety.

TECHNICAL FIELD

The present disclosure is related to machine learning and, in particular, to an ensemble learning system that is trained on testing errors.

BACKGROUND

Machine-learning classifiers process data items to identify specific elements (entities) in the data items. For example, an audio classifier may process an audio data item such as a voice recording to identify voice patterns of specific individuals, and an image classifier may process sets of image data items to classify the data items as to whether they include a particular element, such as an image of the face of a particular person. Identification tasks may also classify data items according to broader classes of entities, for example, all dogs or all animals in a video, image, or set of images. Some identification systems are trained using training data and then, once the system is trained, the system is tested using test data sets and retrained until the test data sets indicate a desired level of performance Trained classification systems may be subject to two types of errors: erroneous identification and failed identification.

SUMMARY

The examples below describe efficient mechanisms, techniques and/or concepts for improving precision and recall in a machine learning by utilizing multiple machine-learning techniques including ensemble classification.

These examples are encompassed by the features of the independent claims. Further embodiments are apparent from the dependent claims, the description and the figures.

Embodiments employ multiple trained machine-learning classifiers and one or more ensemble classifiers to reclassify misclassified elements and classify unclassified elements in data items produced by other machine-learning classifiers.

According to a first aspect, a machine-learning classification system includes a first machine-learning classifier that is trained to classify elements in data items. The output classifications generated by the first machine-learning classifier are further classified by a second machine-learning classifier trained to reclassify misclassified elements in the classifications produced by the first machine-learning classifier. A first ensemble classifier combines the classifications generated by the first, second and third machine-learning classifiers to generate first ensemble classified data items.

These classification results may be further processed by other sets of machine-learning classifiers to reclassify misclassified elements and to classify unclassified elements in the results.

In a first implementation form of the apparatus according to the first aspect as such, the machine-learning system includes a third machine-learning classifier, coupled to the first machine-learning classifier and configured to classify elements that were not classified by the first machine-learning classifier. In this implementation, the first ensemble classifier is configured to adjust the classifications of the elements of the classified data items in response results produced by the first, second and third machine-learning classifiers.

In a second implementation form of the apparatus according to the first aspect as such or any preceding implementation form of the first aspect, the second and third machine-learning classifiers are configured to execute in parallel.

In a third implementation form of the apparatus according to the first aspect as such or any preceding implementation form of the first aspect, the first and second classifiers generate different classifications for elements in a data item of the plurality of data items. In this instance, the first ensemble classifier is configured to change the classification of the elements in the data item according to the classification generated by the second classifier to generate the first ensemble classified data items.

In a fourth implementation form of the apparatus according to the first aspect as such or any preceding implementation form of the first aspect, the third classifier generates a classification for elements in a data item that is not generated by the first classifier. In this instance, the first ensemble classifier adds these newly-classified elements of the data item generated by the third classifier to the classified elements generated by the first classifier to generate the first ensemble classified data items.

In a fifth implementation form of the apparatus according to the first aspect as such or any preceding implementation form of the first aspect, the data items are images including a plurality of pixels and the elements are groups of pixels in the images.

In a sixth implementation form of the apparatus according to the first aspect as such or any preceding implementation form of the first aspect, the first machine-learning classifier includes a first trained classifier that is trained using a first set of labeled data items. The second and third machine-learning classifiers include second and third trained classifiers that are trained on a second set of labeled data items, different from the first set of labeled data items. This second set of labeled data items is generated by the first trained machine-learning classifier.

In a seventh implementation form of the apparatus according to the first aspect as such or any preceding implementation form of the first aspect, a fourth machine-learning classifier is coupled to the ensemble classifier and is configured to reclassify the misclassified elements of the first ensemble classified elements to generate a second plurality of reclassified data items. A fifth machine-learning classifier, also coupled to the ensemble classifier is configured to classify the unclassified elements of the first ensemble classified data items to generate a second plurality of newly-classified data items. A second ensemble classifier changes the classification of the elements of the plurality of first ensemble classified data items in response to the second plurality of reclassified data items and the second plurality of newly-classified data items to generate second ensemble classified data items.

In an eighth implementation form of the apparatus according to the first aspect as such or any preceding implementation form of the first aspect, the fourth and fifth machine-learning classifiers are trained on a third set of labeled data items, different from the first and second sets of labeled data items. The third set of labeled data items is classified by the first, second and third classifiers as modified by the first ensemble classifier.

In a ninth implementation form of the apparatus according to the first aspect as such or any preceding implementation form of the first aspect, each of the first and second machine-learning classifiers is one of a support vector classifier, a random forest classifier, a decision tree classifier, a neural network classifier, a genetic classifier, or a linear regression classifier.

According to a second aspect a machine-learning classification method classifies a plurality of data items, each data item including a plurality of elements. The method includes classifying, by a first machine-learning classifier, each element of the plurality of data items to generate a plurality of classified data items. The method further includes classifying any unclassified elements produced by the first machine-learning classifier into at least one of the plurality of categories to generate a first plurality of newly-classified data items. The method also includes adjusting the classified data items, using a first ensemble classifier, in response to the first plurality of newly-classified data items to generate first ensemble classified data items.

In a first implementation form of the method according to the second aspect as such, the method further includes reclassifying any misclassified elements produced by the first machine-learning classifier to generate a first plurality of reclassified data items. In this implementation, the adjusting of the classified data items using the first ensemble classifier further includes adjusting based on the first plurality of reclassified data items.

In a second implementation form of the method according to the second aspect as such or any preceding implementation form of the second aspect, the method further includes reclassifying the misclassified elements in parallel with classifying the unclassified elements.

In a third implementation form of the method according to the second aspect as such or any preceding implementation form of the second aspect, the method further includes processing each of the first plurality of misclassified data items to change respective representations of the misclassified elements in the first plurality of misclassified data items before reclassifying the misclassified elements in the first plurality of misclassified data items.

In a fourth implementation form of the method according to the second aspect as such or any preceding implementation form of the second aspect, the method further includes adding additional data items to the first plurality of misclassified data items before reclassifying the misclassified elements of the first plurality of misclassified data items.

In a fifth implementation form of the method according to the second aspect as such or any preceding implementation form of the second aspect, the method further includes processing each of the first plurality of unclassified data items to change respective representations of the unclassified elements in the first plurality of unclassified data items before classifying the unclassified elements in the first plurality of unclassified data items.

In a sixth implementation form of the method according to the second aspect as such or any preceding implementation form of the second aspect, the method further includes adding additional data items to the first plurality of unclassified data items before classifying the unclassified elements.

In a seventh implementation form of the method according to the second aspect as such or any preceding implementation form of the second aspect, the data items including the unclassified elements and the misclassified elements comprise a plurality of images, each including a plurality of pixels, and the unclassified elements and the misclassified elements include respective groups of pixels in the plurality of images.

In an eighth implementation form of the method according to the second aspect as such or any preceding implementation form of the second aspect, the method further includes performing at least one of image rotation, image contrast enhancement, image color enhancement, or image edge enhancement on the plurality of images.

In a ninth implementation form of the method according to the second aspect as such or any preceding implementation form of the second aspect, the method further includes training the first machine-learning classifier using a first set of labeled data items; and training machine-learning classifiers that classify the unclassified elements and that reclassify the misclassified elements using a second set of labeled data items, different from the first set of labeled data items, based on classifications of the second set of labeled data items generated by the first trained classifier.

In a tenth implementation form of the method according to the second aspect as such or any preceding implementation form of the second aspect, the method further includes, classifying misclassified elements of the first ensemble classified elements to generate a second plurality of newly-classified data items. The method also includes reclassifying the misclassified elements of the first ensemble classified elements to generate a second plurality of reclassified data items. The method further includes changing, by a second ensemble classifier, the classifications of the elements of the plurality of first ensemble classified data items in response to the second plurality of newly-classified data items and the second plurality of reclassified data items to generate second ensemble classified data items.

In an eleventh implementation form of the method according to the second aspect as such or any preceding implementation form of the second aspect, the method further includes training respective machine-learning classifiers that produce the second plurality of reclassified elements and the second plurality of newly-classified elements using a third set of labeled data items, different from the first and second sets of labeled data items, based on classifications of the third set of labeled data items generated by the first ensemble classifier.

According to a third aspect, a computer program comprises program code for performing the method according to the second aspect or any of its implementation forms when executed on a computer. Thus, the method can be performed in an automatic and repeatable manner. The computer program can be performed by the apparatus. The apparatus can be programmably-arranged to perform the computer program.

According to a fourth aspect, a machine-learning classification apparatus classifies a plurality of data items, each data item including a plurality of elements. The apparatus includes means for classifying, by a first machine-learning classifier, each element of the plurality of data items to generate a plurality of classified data items. The apparatus further includes means for classifying any unclassified elements produced by the first machine-learning classifier into at least one of the plurality of categories to generate a first plurality of newly-classified data items. The apparatus also includes means for adjusting the classified data items, using a first ensemble classifier, in response to the first plurality of newly-classified data items to generate first ensemble classified data items.

In a first implementation form of the apparatus according to the fourth aspect as such, the apparatus further includes means for reclassifying, by any misclassified elements produced by the first machine-learning classifier to generate a first plurality of reclassified data items. This implementation further includes means for adjusting the classified data items based on the first plurality of reclassified data items using the first ensemble classifier.

In a second implementation form of the apparatus according to the fourth aspect as such or any preceding implementation form of the fourth aspect, the apparatus further includes means for reclassifying the misclassified elements that operates in parallel with the means for classifying the unclassified elements.

In a third implementation form of the apparatus according to the fourth aspect as such or any preceding implementation form of the fourth aspect, the apparatus further includes means for processing each of the first plurality of misclassified data items to change respective representations of the misclassified elements in the first plurality of misclassified data items before the reclassifying the misclassified elements in the first plurality of misclassified data items.

In a fourth implementation form of the apparatus according to the fourth aspect as such or any preceding implementation form of the fourth aspect, the apparatus further includes means for adding data items to the first plurality of misclassified data items before reclassifying the misclassified elements of the first plurality of misclassified data items.

In a fifth implementation form of the apparatus according to the fourth aspect as such or any preceding implementation form of the fourth aspect, the apparatus further includes means for processing each of the first plurality of unclassified data items to change respective representations of the unclassified elements in the first plurality of unclassified data items before classifying the unclassified elements in the first plurality of unclassified data items.

In a sixth implementation form of the apparatus according to the fourth aspect as such or any preceding implementation form of the fourth aspect, the apparatus further includes means for adding data items to the first plurality of unclassified data items before classifying the unclassified elements.

In a seventh implementation form of the apparatus according to the fourth aspect as such or any preceding implementation form of the fourth aspect, the data items including the unclassified elements and the misclassified elements comprise a plurality of images, each including a plurality of pixels, and the unclassified elements and the misclassified elements include respective groups of pixels in the plurality of images.

In an eighth implementation form of the apparatus according to the fourth aspect as such or any preceding implementation form of the fourth aspect, the apparatus further includes means for performing at least one of image rotation, image contrast enhancement, image color enhancement, or image edge enhancement on the plurality of images.

In a ninth implementation form of the apparatus according to the fourth aspect as such or any preceding implementation form of the fourth aspect, the apparatus further includes means for training the first machine-learning classifier using a first set of labeled data items; and means for training machine-learning classifiers that classify the unclassified elements and that reclassify the misclassified elements using a second set of labeled data items, different from the first set of labeled data items, based on classifications of the second set of labeled data items generated by the first trained classifier.

In a tenth implementation form of the apparatus according to the fourth aspect as such or any preceding implementation form of the fourth aspect, the apparatus further includes means for classifying misclassified elements of the first ensemble classified elements to generate a second plurality of newly-classified data items. The apparatus also includes means for reclassifying the misclassified elements of the first ensemble classified elements to generate a second plurality of reclassified data items. The apparatus further includes means for changing, by a second ensemble classifier, the classifications of the elements of the plurality of first ensemble classified data items in response to the second plurality of newly-classified data items and the second plurality of reclassified data items to generate second ensemble classified data items.

In a eleventh implementation form of the apparatus according to the fourth aspect as such or any preceding implementation form of the fourth aspect, the apparatus further includes means for training respective machine-learning classifiers that produce the second plurality of reclassified elements and the second plurality of newly-classified elements using a third set of labeled data items, different from the first and second sets of labeled data items, based on classifications of the third set of labeled data items generated by the first ensemble classifier.

Embodiments can be implemented in hardware, software or in any combination thereof.

The explanations provided for each of the first through fourth aspects and their implementation forms apply equally to other ones of the first through fourth aspects and the corresponding implementation forms. These aspects and implementation forms may be used in combination with one another.

BRIEF DESCRIPTION OF THE DRAWINGS

Further embodiments are described below with respect to the following figures, in which.

DETAILED DESCRIPTION

Figure 1:
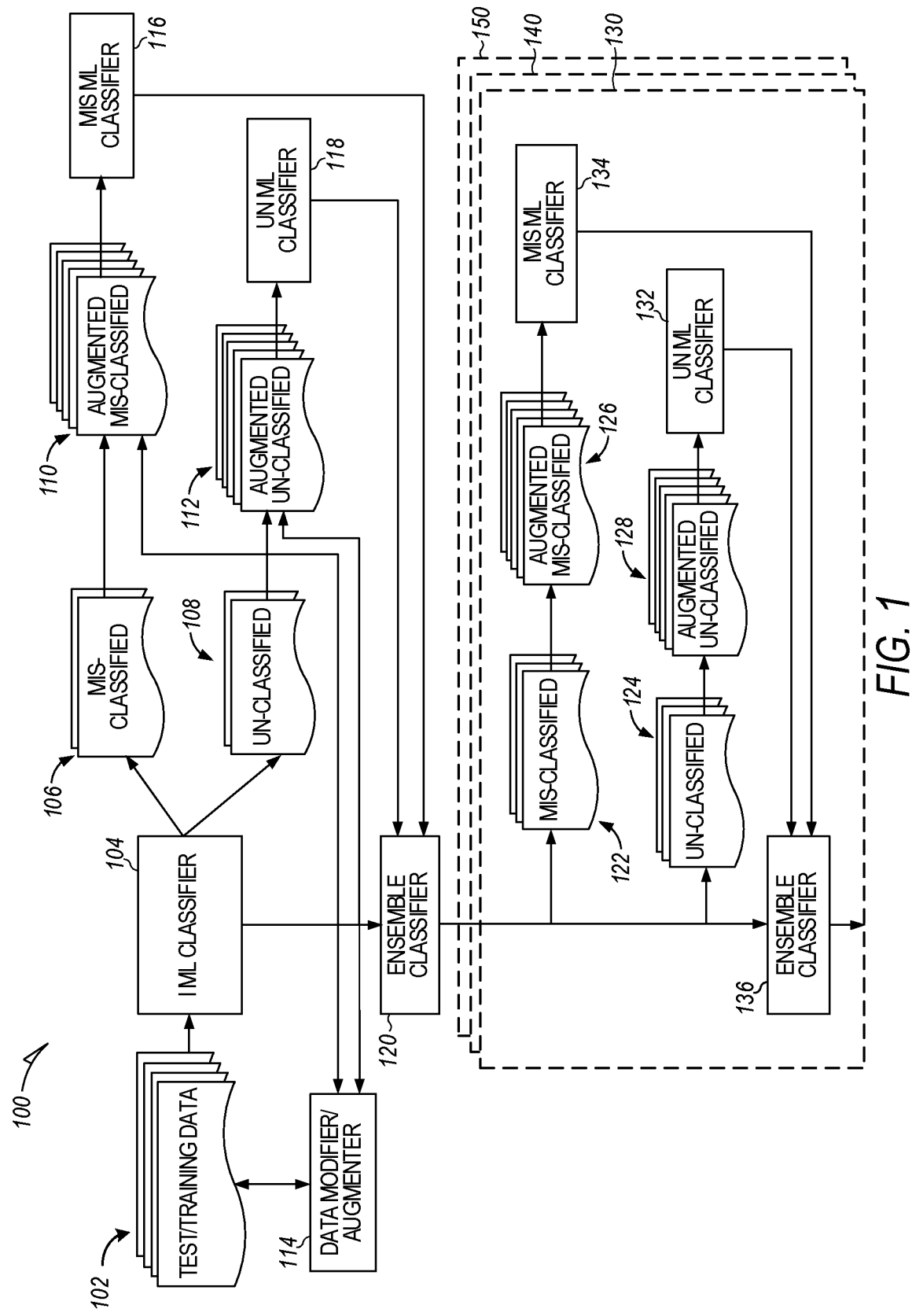
FIG. 1 is a functional block diagram of an iterative/recursive ensemble classifier in a training phase, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the disclosed subject matter, and it is to be understood that other embodiments may be utilized, and that structural, logical and electrical changes may be made without departing from the scope of the claims. The following description of example embodiments is, therefore, not to be taken in a limited sense, and does not affect the scope of the claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on processing hardware including one or more of a digital signal processor, application-specific integrated circuit (ASIC), microprocessor, field-programmable gate array (FPGA), or other type of logic hardware operating in a computer system, such as a personal computer, server or other computer system, turning such computer system into a specifically programmed machine.

Machine learning is a field of study that gives computers the ability to learn without being explicitly programmed Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools.

In some example embodiments, different machine-learning algorithms may be used. For example, logistic regression, decision tree, random forest, artificial neural network (ANN), genetic algorithm, and support vector machine tools may be used for classifying or scoring data sets. In addition, some embodiments employ ensemble learning in which an ensemble classifier is configured or is trained to classify elements based on classifications determined by other classifiers. The examples below describe a classification system that employs multiple machine-learning tools to generate results that are processed by an ensemble classifier to improve the classification performed by an initial classifier. The classification system may include several recursively or iteratively implemented levels that classify input data items to improve both the precision and recall of the classification system compared to a single level system.

In machine-learning classification systems, precision or positive predictive value describes a ratio of the correctly classified elements to all of the classified elements in all data items applied to the classification system. One measure of precision is the number of true positives divided by the sum of true positives and false positives. Recall, or sensitivity, describes a fraction of the number of classified elements that have been correctly classified over the total number of elements in the data items that could be classified. A measure of recall is the number of true positives to the sum of true positives and false negatives.

Classification systems are subject to two types of errors on the test data. One type is failed classifications, which are manifest as unclassified elements in the data items. The other type of error is erroneous identification, which is manifest as misclassified elements in the data items. Unclassified elements are elements in the data items which could have been classified but were not. Misclassified elements are elements in the data items that were not properly identified. The embodiments described below employ an initial trained classifier to classify elements in a set of data items (a data set) and also employ separate classifiers to identify and classify unclassified elements and to identify and reclassify misclassified elements. The classifications produced by the initial classifier, the unclassified element classifier, and the misclassified element classifier are processed by an ensemble classifier to increase the precision and recall of the classification performed by the initial classifier. Thus, the classifier that classifies unclassified elements improves the recall of the system, and the classifier that reclassifies the misclassified elements improves the precision of the system.

The example system may recursively or iteratively apply the same techniques at multiple levels to further improve the recall and precision of the classification system. At each level, the previous level(s) are treated as the initial classifier, and separate classifiers are trained at each level to classify unclassified elements from the previous levels and to reclassify misclassified elements from the previous levels.

The examples described below may be applied to any system that processes data items to classify elements in the data items of a data set. Thus, example systems may be used without limitation for many tasks. For example, systems may be used to improve the performance of artificial intelligence (AI) sound recognition systems, including voice recognition systems and systems that recognize voices of specific individuals. The classification systems may also be used in AI image classification and recognition systems including image classification systems, image search systems such as facial recognition systems, and image surveillance systems.

Thus, although the examples described below are in the context of an image classification system it is understood that the described subject matter has broad application to other types of identification, recognition or classification systems.

Figure 2A:
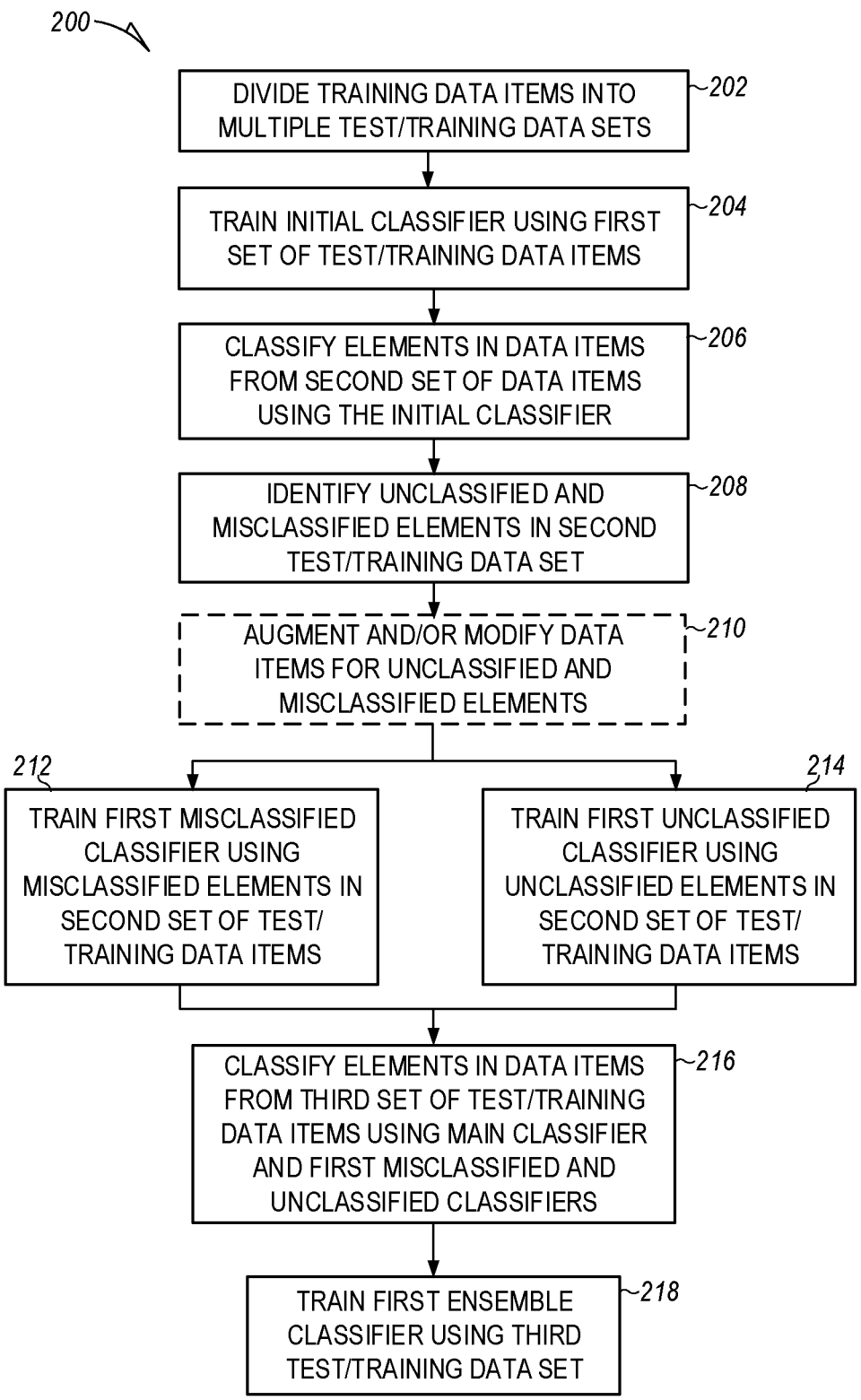
FIG. 2A is a flow-chart diagram of a process for training a single-level classifier or for training one level of an iterative/recursive ensemble classifier, according to an example embodiment.
Figure 2B:
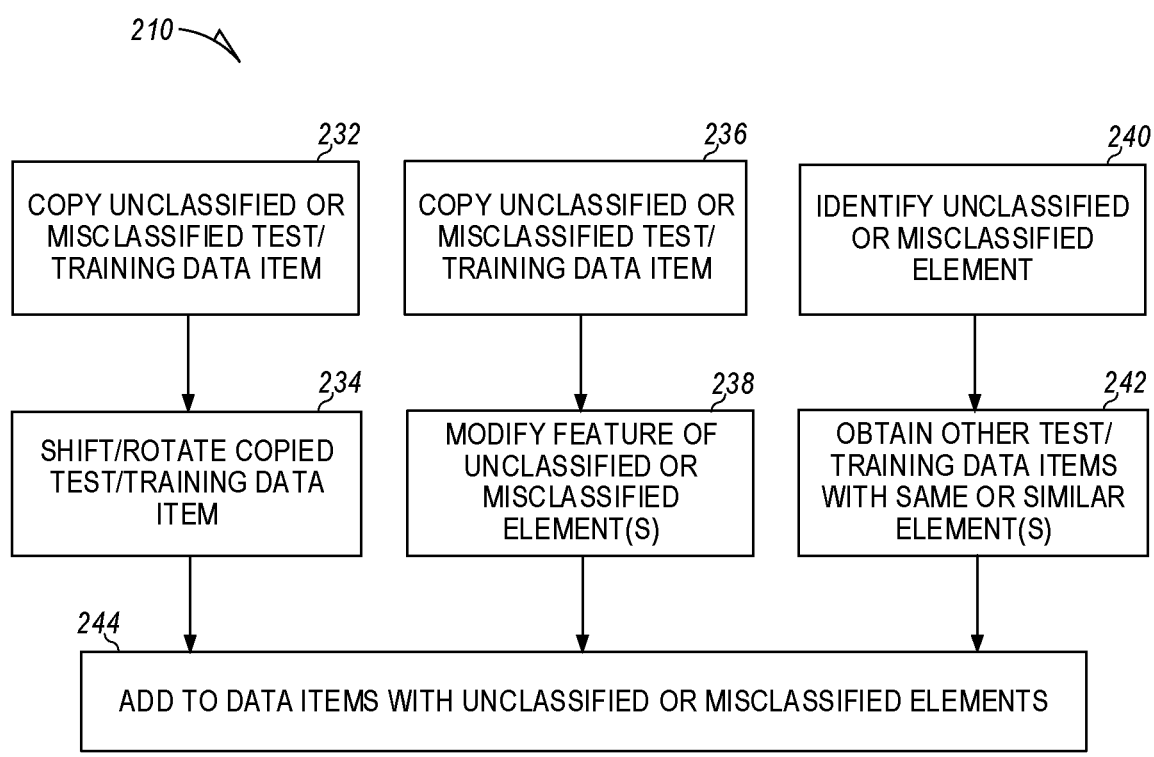
FIG. 2B is a flow-chart diagram of a process for augmenting and/or modifying unclassified or misclassified test/training data, according to an example embodiment.

FIG. 1 is a functional block diagram of a recursive/iterative ensemble classifier in a training phase according to an example embodiment. FIGS. 1, 2A and 2B describe an example method to train the classifier while FIGS. 3 and 4 describe example implementations and uses of a trained classifier.

FIG. 1 shows a system 100 in which an initial machine-learning (I ML) classifier 104 receives training data 102. The example training data 102 includes a plurality of labeled data sets, where each data set includes multiple labeled data items where the labels identify the elements in each of the data items that could be recognized by the I ML classifier 104. In the context of an image classification system, the I ML classifier 104 may include a multi-level classification system including a general classification/detection service that provides an entry level classification of the image as a whole and blob detection to parse out objects in the image. The I ML classifier 104 may also outline detected blobs in the image with the bounding boxes (not shown). The bounded elements may then be processed by one or more specific classifiers to identify the elements. Each classified element in the data items may be accompanied one or more indications that a particular element has been identified. The indication may be a Boolean value indicating whether the element was identified in the data item and/or a confidence value indicating a likelihood that the element was identified. When the indication is a confidence value, the classifier 104 may compare this confidence value to a threshold to determine whether the element has been identified.

The example I ML classifier 104 is trained, as described below with reference to FIGS. 5A and 5B, using labeled training data and tested using labeled test data. The labeled test/training data 102 is used to identify errors in classifying the elements. In the example systems, these errors are back-propagated to adjust parameters of the I ML classifier 104 in a manner that tends to reduce erroneous classifications. Training data and test data may be applied to the I ML classifier 104, as described below with reference to FIG. 5, until the error rate is less than a threshold level, in which case the I ML classifier 104 is a trained classifier.

Referring again to FIG. 1, when the I ML classifier 104 is trained, the system applies labeled test data 102 to the I ML classifier 104. The labeled test data is essentially the same as the labeled training data. The I ML classifier 104 properly classifies some of the test data 102, misclassifies some of the test data 102, and fails to classify some of the test data 102. The misclassified test data 106 may be augmented, as described below, to generate an augmented misclassified data set 110, which is applied to a misclassified machine-learning classifier 116. The misclassified machine-learning classifier 116 uses either the misclassified test data set 106 or the augmented misclassified test data set 110 as training data to train the misclassified machine-learning classifier 116. The misclassified machine-learning classifier 116 is trained to identify and reclassify elements in data items that have been misclassified by the I ML classifier 104.

The augmented misclassified data set 110 may be generated by providing the data items 106 including misclassified elements to a data modifier/augmenter 114 concurrently with the misclassified data items 106 being provided (not shown) to the augmented misclassified data set 110. The data modifier/augmenter 114 may modify the data items, for example, by rotating, shifting, increasing the brightness, or increasing the contrast of the image. These modified data items may be included with the unmodified data items in the augmented misclassified data set 110. The modifier/augmenter 114 may also or alternatively analyze the misclassified elements to identify similar elements in the test/training data 102 and provide these similar elements to the augmented misclassified data set 110. The augmented misclassified data set 110 may be used to train the MIS ML classifier 116. For example, the I ML classifier 104 may be trained to recognize horses in an image. The I ML classifier 104, however, may misclassify an image of a donkey as a horse. In this instance, the data modifier/augmenter 114 may obtain other data items including horses and data items including donkeys to augment the misclassified data set 106 provided by the I ML classifier 104. The MIS ML classifier 116 may then be then trained using the augmented misclassified data set 110 to identify and reclassify data items including elements that may have been misclassified by the I ML classifier 104.

Similarly, an unclassified data set 108 may include data items including elements that were not classified by the I ML classifier 104. The unclassified data set 108 may be modified and/or augmented as described above to produce an augmented unclassified data set 112 used to train an unclassified machine-learning (UN ML) classifier 118. The augmenting of the unclassified test data set 108 is optional. The unclassified machine-learning classifier 118 may be trained on either the unclassified data set 108 or the augmented unclassified data set 112.

The data set 108 or 112, including data items having unclassified elements, may be applied to the data modifier/augmenter 114 to identify data items similar to the data items including the unclassified elements. These similar data items may also be used to train the UN ML classifier 118. For example, the I ML classifier 104 may be trained to recognize facial images of a particular person. The test data may show that the classifier is successful in classifying full-face images of the person but does not recognize profile images of the person or recognizes the profile images with lower confidence. The data modifier/augmenter 114 may identify more data items similar to the data items including the unclassified elements (e.g., data items including profile images or less than full-face images of the person) and add these data items to the augmented unclassified data set 112. The unclassified machine-learning classifier 118 is then trained on the augmented unclassified data set 112 (or unclassified data set 108) to produce a trained classifier that identifies and classifies elements in data items that may not be classified by the trained I ML classifier 104.

After the MIS ML classifier 116 and the UN ML classifier 118 have been trained, a second set of test data 102 is applied to the I ML classifier 104, and results produced by the I ML classifier 104 are applied to the classifier's 116 and 118. The classified results produced by the classifiers 104, 116, and 118 are applied to an ensemble classifier 120. The ensemble classifier 120 may be a trained classifier or it may be a decision engine. When implemented as a decision engine, the ensemble classifier 120 may add any classified data items from the classifier 118, which include elements that were not classified by the I ML classifier 104, to the classified data set produced by the ensemble classifier 120. In addition, the decision engine may reclassify any data items provided by the I ML classifier 104, which include elements that were classified differently by the classifier 116, such that the classification determined by the classifier 116 overrides the classification determined by the I ML classifier 104.

Alternatively, rather than making a decision based on the source of the classified data items, the ensemble classifier 120 may be implemented as a machine-learning ensemble classifier 120 that applies weights to the classified data items provided by the classifiers 104, 116, and 118 to generate an ensemble classified data set and uses back propagation of errors identified in the labeled test data to adjust the weights in order to improve the performance of the ensemble classifier 120. This process may continue over several test data sets until the performance of the ensemble classifier is satisfactory.

As described above, the classification system including the classifiers 104, 116, 118, and 120 may be implemented iteratively or recursively to further enhance the precision and recall of the combined classification system. In these implementations, the output of the ensemble classifier 120 may be processed by successive layers of misclassified machine-learning classifiers and unclassified machine-learning classifiers to further improve the recall and precision of the system.

When the example classification system is implemented as a multi-level system, the output of the ensemble classifier 120 is handled by the misclassified and unclassified classifiers in the next level in the same way as the output of the I ML classifier 104 described above is handled by the classifiers 116 and 118. In particular, the classified data set generated by the ensemble classifier 120 is processed by a second-level classification system 130 based on the labeled data to store data items including misclassified elements in a misclassified data set 122 and data items including unclassified elements in an unclassified data set 124. The misclassified and unclassified data sets 122 and 124 may be augmented to produce an augmented misclassified data set 126 and/or an augmented unclassified data set 128. In an example system, the misclassified data set 122 or the augmented misclassified data set 126 is applied to train a second level misclassified machine-learning classifier 134. Similarly, the unclassified data set 124 or the augmented unclassified data set 128 is applied to train a second level unclassified machine-learning classifier 132.

After training the second level classifiers 132 and 134, a second level ensemble classifier 136 may be trained by processing yet another set of test data through the trained classifiers 104, 116, 118, 120, 132, and 134 such that the results provided by the classifiers 120, 132, and 134 are applied to the second level ensemble classifier 136. The second level ensemble classifier 136 may also be a decision engine that does not need to be trained. The second level ensemble classifier 136 processes the results produced by the classifiers 120, 132, and 134 in the same way that the ensemble classifier 120 processes the results produced by the classifiers 104, 116 and 118, as described above.

The example system shown in FIG. 1 may include further classification systems 140 and 150 such that the classified data set produced by the second level ensemble classifier 136 is applied to the classification system 140 and classified data set of an ensemble classifier (not shown) of the system 140 is applied to the classification system 150. The classification systems 140 and 150 may be identical to the classification system 130. Although the example system shown in FIG. 1 includes four levels of classifiers, it is contemplated that more or fewer levels may be implemented in a particular system.

Figure 4:
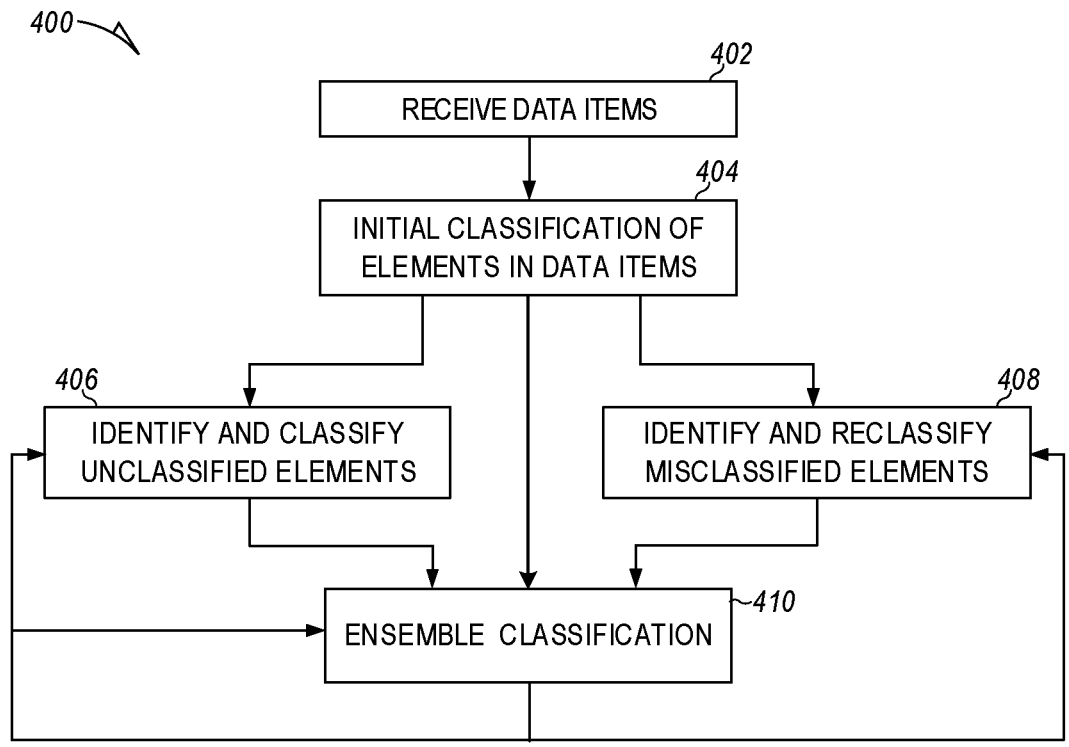
FIG. 4 is a flow-chart diagram of an iterative/recursive ensemble classification process, according to an example embodiment.

The system shown in FIG. 1 illustrates an iterative implementation of the multilevel classifier 100. The multilevel classifier 100, however, may alternatively be implemented recursively. An example of a recursive classification system is shown in FIG. 4. In a recursive implementation, a single misclassified machine-learning process may be used to implement all of the misclassified machine-learning classifiers 116, 134, and so forth; a single unclassified machine-learning process may be used to implement all of the unclassified machine-learning classifiers 118, 132, and so forth; and a single ensemble process may be used to implement all of the ensemble classifiers, 120, 136, and so forth. In the recursive implementation, each of these processes would be invoked multiple times with different parameter sets and different sets of misclassified and unclassified data items being used at the respective multiple levels of the system.

FIG. 2A is a flow-chart diagram of a process 200 for training a single-level ensemble classification system or for training one level of an iterative/recursive ensemble classification system, according to an example embodiment. In block 202, the process 200 divides the training data into multiple sets of training data and test data. Each set includes multiple data items and each data item is labeled with the elements that may be found in the item. At block 204, the process trains the initial classifier 102 based on a first set of the training data. The result of block 204 is a trained initial classifier. At block 206, the process 200 uses the trained initial classifier to classify data items of a second data set produced by block 202. Block 206 produces a data set including data items having elements that are properly classified by the I ML classifier 104, data items having elements that were misclassified by the I ML classifier 104, and data items having elements that were not classified by the I ML classifier 104. These data items may not be exclusive; a data item including elements that were properly classified may also include elements that were misclassified and/or elements that were not classified.

In block 208, the data items having elements that were misclassified are grouped together as the misclassified data set 106, shown in FIG. 1. The data items including unclassified elements are grouped together as the unclassified data set 108, shown in FIG. 1. As described above, the respective misclassified machine-learning classifier 116 and the unclassified machine-learning classifier 118 may be trained using either the misclassified data set 106 and unclassified data set 108 or on the augmented misclassified data set and augmented unclassified data set 112. The process 200 optionally executes block 210, shown using dashed lines, to generate the augmented data set 110 and 112. An example implementation of the augmentation process of block 210 is described below with reference to FIG. 2B.

Block 212 trains the misclassified machine-learning classifier 116 using either the misclassified data set 106, resulting from passing the test data through the trained I ML classifier 104, or the augmented misclassified data set 110. Similarly, block 214 trains the unclassified machine-learning classifier 118 using either the unclassified data set 108, resulting from passing the test data through the trained I ML classifier 104, or the augmented unclassified data set 112. In the example system, the processes of blocks 212 and 214 run in parallel as they are not dependent on one another. Block 212 produces a trained misclassified machine-learning classifier 116 and block 214 produces a trained unclassified machine-learning classifier 118.

After blocks 212 and 214, the process 200, in block 216, applies a third data set generated in block 202 as test data to the trained I ML classifier 104, trained misclassified machine-learning classifier 116, and trained unclassified machine-learning classifier 118. When the ensemble classifier 120 is a machine-learning classifier, the third data set is used in block 218 to train the ensemble classifier 120.

As described above, the ensemble classifier 120 may be a decision engine rather than a trained classifier. In this instance, the ensemble classifier would not need to be trained and blocks 216 and 218 may be omitted from the process 200 shown in FIG. 2A. The result of the process 200, shown in FIG. 2A, is one level of a fully trained ensemble.

FIG. 2B is a flow-chart diagram of a process corresponding to block 210 of FIG. 2A, for augmenting and/or modifying the unclassified and/or misclassified training data, according to an example embodiment. This process may be performed by the data modifier/augmenter 114, shown in FIG. 1. FIG. 2B shows three example methods for augmenting/modifying the test/training data for an image classification system. These include shifting or rotating the test/training data item, modifying features of unclassified or misclassified elements in the test/training data item, and obtaining other test/training data items that have elements similar to the unclassified or misclassified elements in the set of test/training data items. As the same techniques are applied to both the unclassified and misclassified test/training data items, only one process 210 is shown in FIG. 2B. It is contemplated that separate processes 210 would be executed to generate the augmented misclassified data set 110 and the augmented unclassified data set 112 shown in FIG. 1.

In block 232, the process 210 copies one of the unclassified or misclassified test/training data items in the misclassified data set 106 or unclassified data set 108. At block 234, the copied test/training data item is shifted or rotated to generate a new test/training data item. When the data item is an image, the shifting operation may translate the image in the XY plane or perform an affine transformation on the image. The rotating operation may rotate the image in the XY plane about an axis in the Z direction or perform a parametric transformation on the image. The shifting or rotation may, for example, change pixel positions, view directions, and/or boundary conditions in the test/training data item which may, in turn, change the way the test/training data item is processed by classifier 116 or 118.

Block 236, similar to block 232, copies an unclassified or misclassified test/training data item from the misclassified data set 102 or unclassified data set 108. At block 238, the copied data item is modified to change one or more features of the data item such that the corresponding feature(s) of the misclassified or unclassified data item is also changed. For example, in an image context, block 238 may adjust the brightness or contrast of the copied data item or change the color saturation.

Block 240 identifies at least one unclassified or misclassified element in one or more unclassified or misclassified test/training data items in the set 106 or 108. This information may be determined from the labels on the test/training data items. At block 242, the process 210 identifies additional data items in the test/training data set 102 that include the same or similar elements. For example, if the classification system 100 is being trained to recognize horses in the image data items and the misclassified or unclassified data items indicate that a donkey has been misclassified as a horse or that an image of a horse has not been classified, block 242 may obtain other data items from the test/training data sets 102 that include horses and/or donkeys.

In block 244, the data items generated in blocks 234, 238, and/or 242 are added to generate the augmented misclassified or unclassified data set 110 or 112. As described above, the system uses the augmented misclassified data set 110 to train the misclassified machine-learning classifier 116 and uses the augmented unclassified data set 112 to train the unclassified machine-learning classifier 118.

Figure 3:
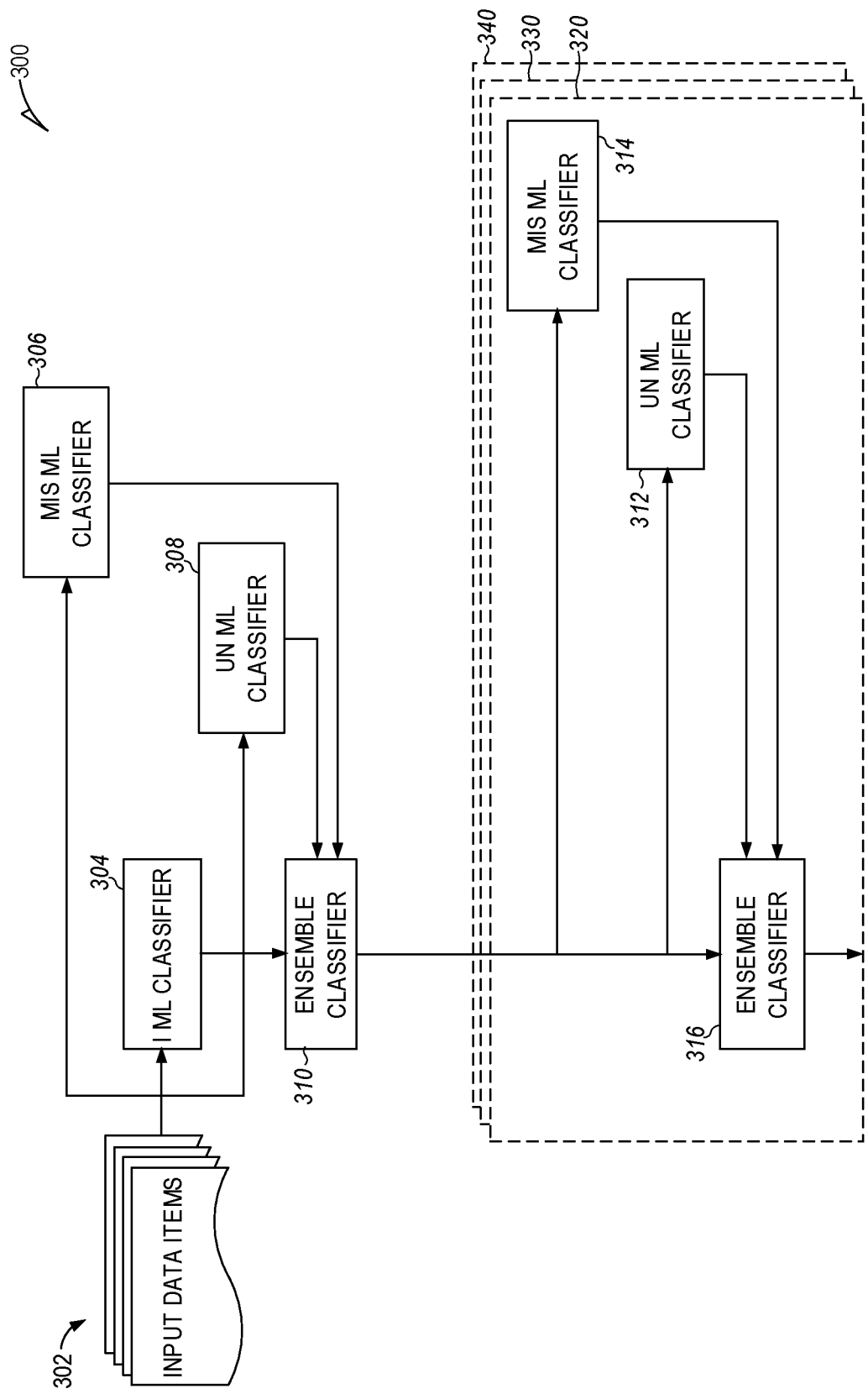
FIG. 3 is a functional block diagram of an iterative/recursive ensemble classifier in a recognition phase, according to an example embodiment.

FIG. 3 is a functional block diagram of a fully trained iterative ensemble classification system 300 in a classification phase, according to an example embodiment. The classifiers 304, 306, 308, 310, 312, 314, and 316 correspond to the respective trained classifiers 104, 116, 118, 120, 132, 134, and 136 shown in FIG. 1. The example classification system in FIG. 3 shows the input data items 302 being classified in parallel by the initial machine-learning classifier 304, the misclassified machine-learning classifier 306, and the unclassified machine-learning classifier 308. The results of all three classifiers are applied to the ensemble classifier 310. When the ensemble classifier 310 is a decision engine, the ensemble classifier 310 replaces the classification performed by the classifier 304 with the classification performed by the classifier 306 when it encounters a data item that was classified differently by the initial classifier 304 and the misclassified classifier 306. Similarly, when the ensemble classifier 310 encounters a classification of a data item from the unclassified classifier 308 that is missing from the classifications provided by the initial classifier 304, the ensemble classifier 310 adds the data item from the unclassified classifier 308 to the set of classified data items. The ensemble classifier 310 may also be a trained machine-learning classifier. In this instance, the ensemble classifier 310 provides the classified data items according to its training.

The classified data items generated by the ensemble classifier 310 are applied to a second level classification system 320 including a second level misclassified machine-learning classifier 314, a second level unclassified machine-learning classifier 312, and a second level ensemble classifier 316. As with the first level classifier, the second level ensemble classifier 316 may cause the classifications from the classifier 314 to override the classifications provided by the ensemble classifier 310 when these classifications differ. Similarly, the ensemble classifier 316 may cause any classification generated by the classifier 312 that does not exist in the classifications provided by the ensemble classifier 310 to be added to the set of classified data items. As shown in FIG. 3, the classification system 300 may include additional classification, for example third and fourth level classification systems 330 and 340. Each of the systems 330 and 340 may be identical to the system 320 and receive its input data from the previous system 320 and 330, respectively.

Because each of the misclassified machine-learning classifiers 306 and 314 is trained on elements that were misclassified by classifiers earlier in the processing flow, and each of the unclassified machine-learning classifiers 308 and 312 is trained on elements that were not classified by classifiers early in the processing flow, the multi-level classification system has better precision and recall than the initial trained classifier 304 alone and better precision and recall than the combination of the initial trained classifier 304, the top-level misclassified classifier 306, the top-level unclassified classifier 308, and the top-level ensemble classifier 310.

FIG. 4 is a flow-chart diagram of a recursive ensemble classification process 400, according to an example embodiment. At block 402, the process 400 receives the data items to be classified and provides them to the initial classifier for classification in block 404. After the initial classification, the classified data items are applied in parallel to the unclassified classifier in block 406 and to the misclassified classifier in block 408. Classified data items from the initial classification block 404, unclassified classification block 406, and misclassified classification block 408 are applied in parallel to the ensemble classification block 410. The results from the ensemble classification block 410 are applied in parallel to the unclassified classification block 406, misclassified classification block 408, and ensemble classification block 410 as shown in FIG. 4. In the recursive embodiment, the same classification blocks 406, 408, and 410 may be used for each level of the classification system with different parameters defining the operation of the various classifiers at each level.

Figure 5A:
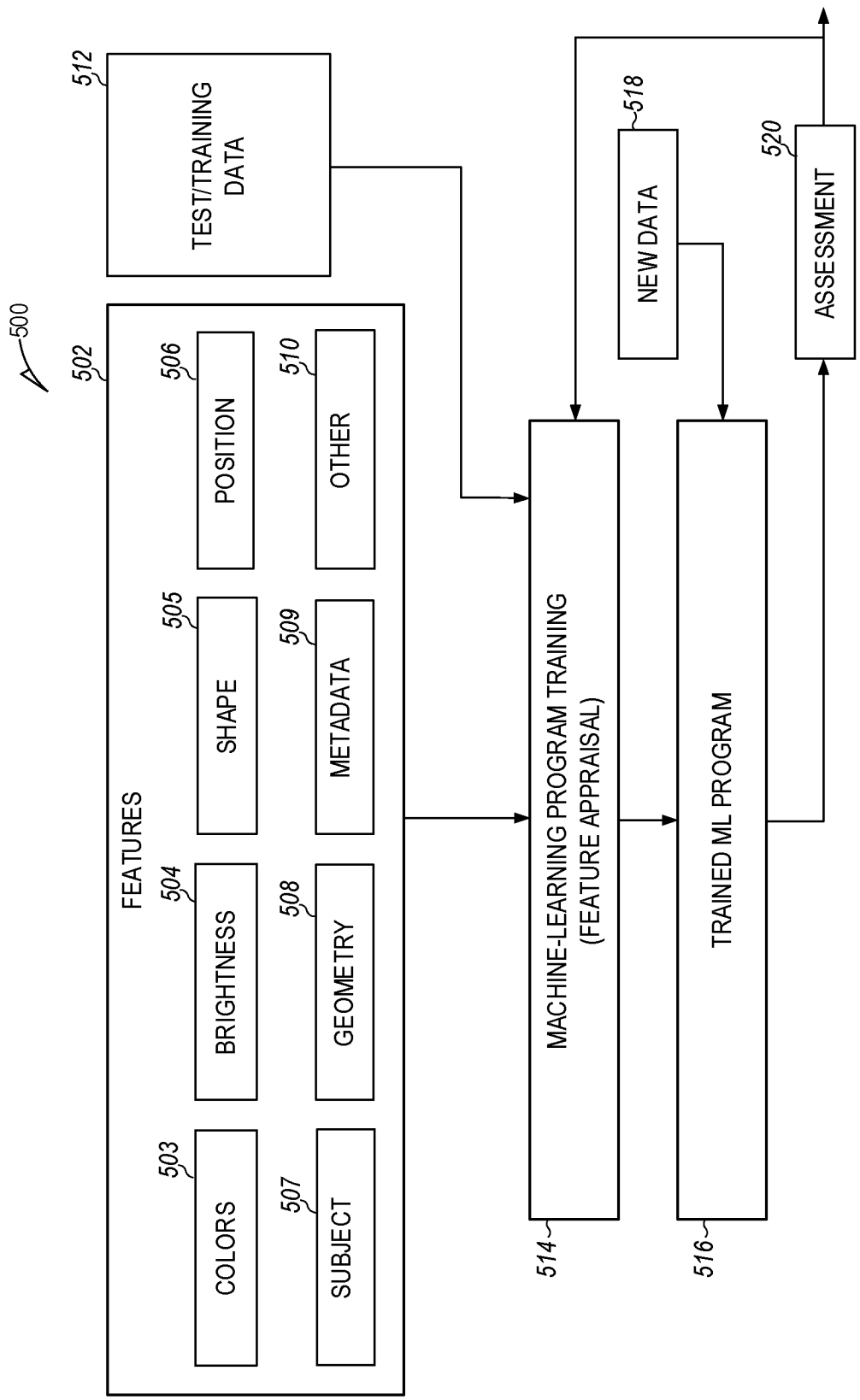
FIG. 5A is a block diagram illustrating components of a machine-learning system, according to an example embodiment.

FIG. 5A is a block diagram illustrating components of a machine-learning classifier 500, according to an example embodiment. The classifier 500 shown in FIG. 5 may be used as any of the classifiers 104, 116, 118, 132, or 134 shown in FIG. 1 or any of the corresponding classifiers shown in FIG. 3. FIG. 5 shows examples of the training and use of the machine-learning classifier. In some example embodiments, machine-learning classifiers (MLCs), also referred to as machine-learning algorithms or tools, are utilized to perform operations associated with searches, such as image searches.

Machine learning is a field of study that gives computers the ability to learn without being explicitly programmed Machine learning explores the study and construction of algorithms, also referred to herein as tools, that may learn from existing data and make predictions about new data. Such machine-learning tools operate by building a model from example training data from a test/training data store 512 in order to make data-driven predictions or decisions expressed as outputs or assessments 520. Although example embodiments are presented with respect to a few machine-learning tools, the principles presented herein may be applied to other machine-learning tools.

In some example embodiments, different machine-learning tools may be used. For example, logistic regression, decision tree, random forest, artificial neural network (ANN), genetic algorithm, and/or support vector machine tools may be used for classifying or scoring elements of image data items.

Two common types of problems in machine learning are classification problems and regression problems. Classification problems, also referred to as categorization problems, aim at classifying items into one of several category values (for example, does this image include an image of an apple or an image of an orange?). Regression algorithms aim at quantifying some items (for example, by providing a value that is a real number). In some embodiments, example machine-learning algorithms provide an image confidence score (e.g., a number from 1 to 100) to qualify the confidence that each image data item includes an element corresponding to a particular category. A machine-learning regression algorithm may be used as a classification algorithm by applying a threshold to the result of the regression algorithm such that results having a confidence value greater than the threshold are classified as including an element to be recognized and results having a value less than the threshold are classified as not including the element. The machine-learning algorithms utilize the training data from the store 512 to find correlations among identified features 502 in the image and corresponding features in the model that affect the outcome.

The machine-learning algorithms utilize features 502 of the element(s) to analyze the data to generate assessments 520. A feature 502 is an individual measurable property of an element being observed. The concept of a feature is related to that of an explanatory variable used in statistical techniques such as linear regression. Machine-learning systems use features that are informative, discriminating, and independent to implement pattern recognition, classification, and regression. Features may be of different types, such as numeric features, text strings, graphs, and features particular to a type of data item being processed. In one example embodiment, the features 502 for an image classification system may include one or more of colors 503, brightness values 504, shapes 505, positions 506, subjects 507, geometries 508, image metadata 509, and other image attributes 510.

The machine-learning algorithms process the training data from a test/training data store 512 to find correlations between the training data and the identified features 502 that affect the outcome or assessment 520. In some example embodiments, the training data from the store 512 includes labeled data, which is known feature data 502 for one or more elements to be identified and/or one or more outcomes, such as the presence of an image of a class of elements (e.g., plants, animals, rocks), the presence of an image of a particular element (e.g., horse, dog, cat), or the presence of an image of a combination of objects (e.g., person riding a bicycle).

With the training data from the store 512 and the identified features 502, the machine-learning tool is trained at operation 514. The machine-learning tool appraises the values of the features 502 as they correlate to the training data from the test/training data store 512 and adjusts parameters of the machine-learning tool, for example, to identify trends in the parameters such that parameter values for trends of increasing correct assessment are elevated in importance while parameter values for trends of decreasing correct assessment are reduced in importance. The result of the training is the trained machine-learning program 516.

When the machine-learning program 516 is used to perform an assessment, new data 518 is provided as an input to the trained machine-learning program 516, and the machine-learning program 516 generates the assessment 520 as output. The machine-learning program 516, for example, may be trained to classify image data items as to whether they include a particular element, such as an image of the face of a particular person. The assessment may include the input images classified as to whether they include such an image.

After the machine-learning program 516 has been trained, the system may process labeled test data of the test/training data store 512 to gauge the performance of the trained program 516. If the test data indicates poor performance (e.g., low precision and/or recall), the machine-learning program may be trained using additional training data from the store 512. This process may be repeated until the test data indicates satisfactory performance.

An ANN is an example of a trained classifier. An ANN is a computational structure that is loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), and so forth.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph. If the threshold is not exceeded then, generally, the value is not transmitted to a down-graph neuron and the synaptic connection remains inactive. The process of weighting and testing continues until an output neuron is reached, with the pattern and values of the output neurons constituting the result of the ANN processing.

The correct operation of most ANNs relies on correct weights. ANN designers typically choose a number of neuron layers or specific connections between layers including circular connection; however, ANN designers do not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN— here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron and so forth until the input neurons are reached. Backpropagation has become a popular technique to train a variety of ANNs.

Figure 5B:
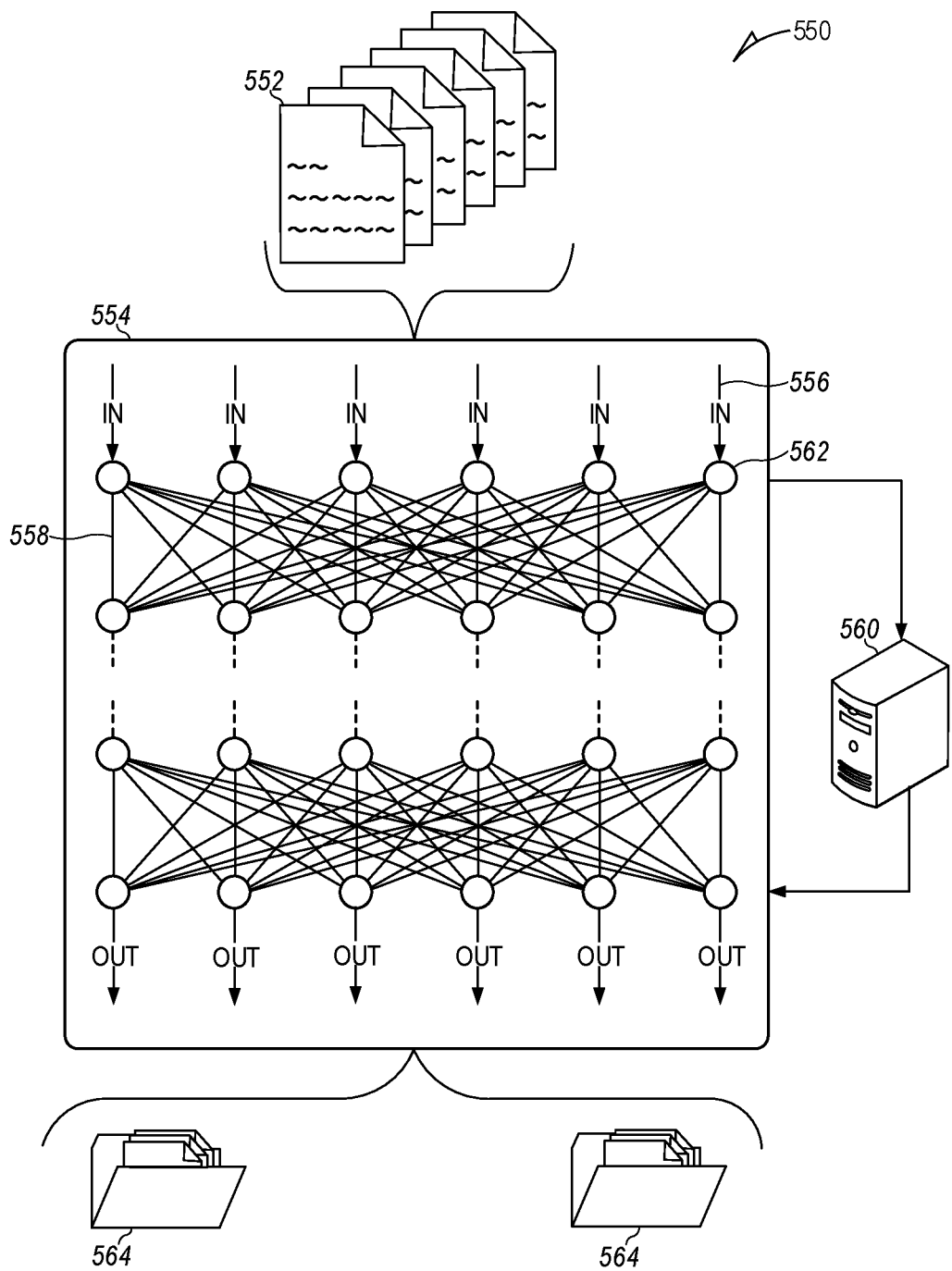
FIG. 5B is a block diagram of an example of an environment including a system for neural network training, according to an embodiment.

FIG. 5B is a block diagram of an example of an environment including a system 550 for neural network training, according to an embodiment. The system includes an ANN 554 that is trained using a processing node 560. The processing node 560 may include processing elements such as a central processing unit (CPU), graphical processing unit (GPU), FPGA, digital signal processor (DSP), ASIC, or other processing circuitry. In an example, multiple processing nodes may be employed to train different layers of the ANN 554, or even different nodes 562 within layers. Thus, a set of processing nodes 560 is arranged to perform the training of the ANN 554.

The set of processing nodes 560 is arranged to receive a training set 552 for the ANN 554. The ANN 554 comprises a set of nodes 562 arranged in layers (illustrated as rows of nodes 562) and a set of inter-node weights 558 (e.g., parameters) between nodes in the set of nodes. In an example, the training set 552 is a subset of a complete training set. Here, the subset may enable processing nodes with limited storage resources to participate in training the ANN 554.

The training data may include multiple numerical values representative of a domain, such as red, green, and blue pixel values; intensity values for an image or pitch; and volume values at discrete times for speech recognition. Each value of the training, or input data 556 to be classified once ANN 554 is trained, is provided to a corresponding node 562 in the first layer or input layer of ANN 554. The values propagate through the layers and are changed by the objective function.

As noted above, the set of processing nodes is arranged to train the neural network to create a trained neural network. Once trained, data input into the ANN will produce valid classifications 564 (e.g., the input data 556 will be assigned into categories), for example. The training performed by the set of processing nodes 562 is iterative. In an example, each iteration of training the neural network is performed independently between layers of the ANN 554. Thus, two distinct layers may be processed in parallel by different members of the set of processing nodes. In an example, different layers of the ANN 554 are trained on different hardware. The different members of the set of processing nodes may be located in different packages, housings, computers, cloud-based resources, and the like. In an example, each iteration of the training is performed independently between nodes in the set of nodes. This example illustrates an additional parallelization whereby individual nodes 562 (e.g., neurons) are trained independently. In an example, the nodes are trained on different hardware.

Figure 6:
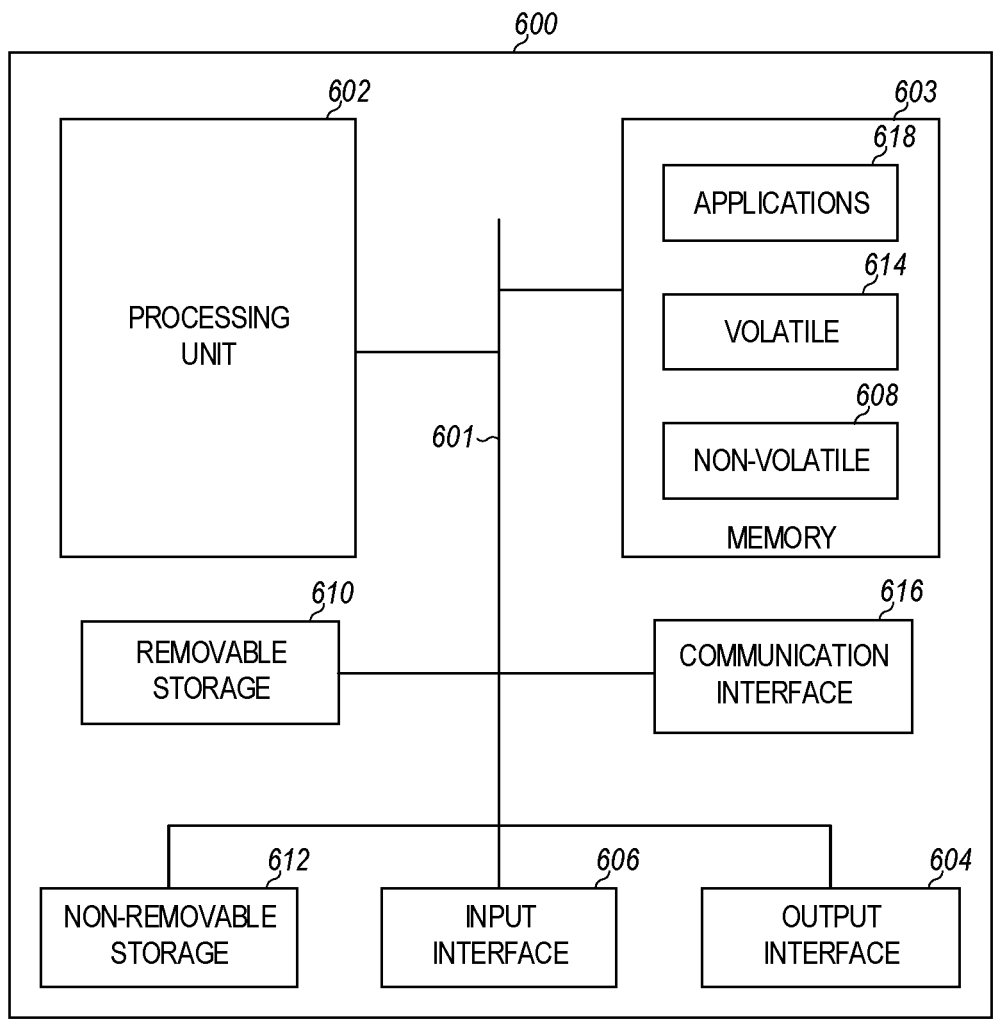
FIG. 6 is a block diagram illustrating circuitry for clients, servers, and cloud-based resources for implementing algorithms and performing methods according to example embodiments.

FIG. 6 is a block diagram illustrating circuitry for clients, servers, cloud-based resources for implementing algorithms and performing methods, according to example embodiments. All components need not be used in various embodiments. For example, the clients, servers, and network resources may each use a different set of components, or in the case of servers for example, larger storage devices.

One example computing device in the form of a computer 600 may include a processing unit 602, memory 603, removable storage 610, non-removable storage 612, a communications interface 616, an input interface 606 and an output interface 604, all connected by a bus 601. Although the example computing device is illustrated and described as computer 600, the computing device may be in different forms in different embodiments. For example, the computing device may instead be a system on a chip (SOC), smartphone, a tablet, smartwatch, or other computing device including the same or similar elements as illustrated and described with regard to FIG. 6. Devices, such as smartphones, tablets, and smartwatches, are generally collectively referred to as mobile devices or user equipment. Further, although the various data storage elements are illustrated as part of the computer 600, the storage may also or alternatively include cloud-based storage accessible via a network, such as the Internet or server-based storage. The computing device 600 may be used to implement all of the classifiers in the system 100, shown in FIGS. 1 and/or 3 or separate computing devices 600 may be used to implement one or more of the classifiers.

Memory 603 may include volatile memory 614 and/or non-volatile memory 608. Computer 600 may include—or have access to a computing environment that includes—a variety of computer-readable media, such as volatile memory 614 and/or non-volatile memory 608, removable storage 610 and/or non-removable storage 612. Computer storage includes random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The memory may store applications 118 that control the operation of the computer 600.

Computer 600 may include or have access to a computing environment that includes input interface 606, output interface 604, and a communication interface 616. Output interface 604 may be coupled to a display device, such as a touchscreen, that also may serve as an input device. The input interface 606 may be coupled to one or more of a touchscreen, touchpad, mouse, keyboard, camera, one or more device-specific buttons, one or more sensors integrated within or coupled via wired or wireless data connections to the computer 600, and other input devices. The computer may operate in a networked environment using the communication interface 616 to connect the computer 600 to one or more remote computers, such as database servers. The remote computer may include a personal computer (PC), server, router, network PC, a peer device or other common network node, or the like. The communication connection may include a Local Area Network (LAN), a Wide Area Network (WAN), cellular, Wi-Fi, Bluetooth, or other networks.

Computer-readable instructions stored on a computer-readable medium are executable by the processing unit 602 of the computer 600. A hard drive, CD-ROM, and RAM are some examples of articles including a non-transitory computer-readable medium such as a storage device. The terms computer-readable medium and storage device do not include carrier waves to the extent carrier waves are deemed too transitory.

In an example embodiment, the computer 600 includes a first classifier module classifying each element of the plurality of data items to generate a plurality of classified data items, an identifier module identifying unclassified elements of the plurality of classified data items to generate a first plurality of unclassified data items, a category module classifying each of the unclassified elements in the first plurality of unclassified data items into at least one of the plurality of categories to generate a first plurality of newly-classified data items, and an ensemble classifier module adjusting the classified data items in response to the first plurality of newly-classified data items to generate first ensemble classified data items. In some embodiments, the computer 600 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A machine-learning classification system comprising:
   a first machine-learning classifier configured to:
      receive a plurality of data items, each data item of the plurality of data items including one or more elements; and
      classify each element of each data item to generate a plurality of classified data items;
   a second machine-learning classifier coupled to the first machine-learning classifier and configured to:
      identify misclassified elements of the plurality of classified data items; and
      reclassify each of the identified misclassified elements to generate a first plurality of reclassified data items;
   a third machine-learning classifier coupled to the first machine-learning classifier and configured to:
      identify unclassified elements of the plurality of classified data items; and
      classify each identified unclassified elements to generate a first plurality of newly-classified data items; and
   a first ensemble classifier coupled to the first, second, and third machine-learning classifiers and configured to adjust the classifications of the elements of the plurality of classified data items in response to the first plurality of newly-classified data items and the first plurality of reclassified data items to generate the first ensemble classified data items.

2. The machine-learning classification system of claim 1, wherein the second and third machine-learning classifiers are configured to execute in parallel.

3. The machine-learning classification system of claim 1, wherein when the first and second classifiers generate different classifications for elements in a data item of the plurality of data items, the first ensemble classifier is configured to change the classification of the elements in the data item according to the classification generated by the second classifier to generate the first ensemble classified data items.

4. The machine-learning classification system of claim 1, wherein when the third classifier generates a classification for elements in a data item that is not generated by the first classifier, the first ensemble classifier is configured to add the classified elements of the data item generated by the third classifier to the classified elements generated by the first classifier to generate the first ensemble classified data items.

5. The machine-learning classification system of claim 1, wherein the data items are images including a plurality of pixels, and the elements are groups of pixels in the images.

6. The machine-learning classification system of claim 1, wherein:
   the first machine-learning classifier includes a first trained classifier that is trained using a first set of labeled data items; and
   the second and third machine-learning classifiers include second and third trained classifiers that are trained on a second set of labeled data items different from the first set of labeled data items, based on classifications of the second set of labeled data items generated by the first trained classifier.

7. The machine-learning classification system of claim 1, further comprising:
   a fourth machine-learning classifier coupled to the ensemble classifier and configured to identify misclassified elements of the first ensemble classified data items and to reclassify the misclassified elements of the first ensemble classified elements to generate a second plurality of reclassified data items;
   a fifth machine-learning classifier coupled to the ensemble classifier and configured to identify unclassified elements of the first ensemble classified data items and to classify the identified unclassified elements of the first ensemble classified data items to generate a second plurality of newly-classified data items; and
   a second ensemble classifier coupled to the first ensemble classifier and to the fourth and fifth machine-learning classifiers and configured to change the classification of the elements of the plurality of first ensemble classified data items in response to the second plurality of reclassified data items and the second plurality of newly-classified data items to generate second ensemble classified data items.

8. The machine-learning classification system of claim 7, wherein the fourth and fifth machine-learning classifiers are trained on a third set of labeled data items, different from the first and second sets of labeled data items, based on classifications of the third set of labeled data items generated by the first ensemble classifier.

9. The machine-learning classification system claim 1, wherein each of the first and second machine-learning classifiers comprises a support vector classifier, a random forest classifier, a decision tree classifier, a neural network classifier, a genetic classifier, or a linear regression classifier.

10. A machine-learning classification method for classifying a plurality of data items, each data item of the plurality of data items including a plurality of elements, the method comprising:
classifying, by a first machine-learning classifier, each element of the plurality of data items to generate a plurality of classified data items;
identifying, by a second machine-learning classifier, unclassified elements of the plurality of classified data items to generate a first plurality of unclassified data items;
classifying, by the second machine-learning classifier, each unclassified element in the first plurality of unclassified data items into at least one of a plurality of categories to generate a first plurality of newly-classified data items;
identifying, by a third machine-learning classifier, misclassified elements of the plurality of classified data items to generate a first plurality of misclassified data items;
reclassifying, by the third machine-learning classifier, each of the misclassified elements in the first plurality of misclassified data items to generate a first plurality of reclassified data items; and
adjusting the classified data items using a first ensemble classifier in response to the first plurality of newly-classified data items and the first plurality of reclassified data items to generate the first ensemble classified data items.

11. The method of claim 10, further comprising processing each of the first plurality of misclassified data items to change respective representations of the misclassified elements in the first plurality of misclassified data items before the reclassifying the misclassified elements in the first plurality of misclassified data items using the third machine-learning classifier.

12. The method of claim 11, wherein the first plurality of unclassified data items and the first plurality of misclassified data items comprise a plurality of images, each including a plurality of pixels, and the unclassified elements and the misclassified elements include respective groups of pixels in the plurality of images.

13. The method of claim 10, further comprising:
training the first machine-learning classifier using a first set of labeled data items; and
training the second and third machine-learning classifiers using a second set of labeled data items different from the first set of labeled data items, based on classifications of the second set of labeled data items generated by the first trained classifier.

14. The method of claim 10, further comprising:
identifying, by a fourth machine-learning classifier, unclassified elements of the first ensemble classified data items;
classifying, by the fourth machine-learning classifier, the identified misclassified elements of the first ensemble classified elements to generate a second plurality of newly-classified data items;
identifying, by a fifth machine-learning classifier, misclassified elements of the first ensemble classified data items to generate a second plurality of misclassified data items;
reclassifying the misclassified elements of the second misclassified data items to generate a second plurality of reclassified data items; and
changing, by a second ensemble classifier, the classifications of the elements of the plurality of first ensemble classified data items in response to the second plurality of newly-classified data items and the second plurality of reclassified data items to generate second ensemble classified data items.

15. The method of claim 14, comprising training the fourth and fifth machine-learning classifiers using a third set of labeled data items, different from the first and second sets of labeled data items, based on classifications of the third set of labeled data items generated by the first ensemble classifier.

16. A non-transitory computer-readable medium storing computer instructions for classifying a plurality of data items, each data item in the plurality of data items including a plurality of elements, the computer instructions, when executed by one or more processors, cause the one or more processors to:
implement a first machine-learning classifier that is configured to classify each element of the plurality of data items to generate a plurality of classified data items;
implement a second machine-learning classifier that is configured to identify unclassified elements of the plurality of classified data items and to classify each of the identified unclassified elements to generate a first plurality of newly-classified data items;
implement a third machine-learning classifier that is configured to classify misclassified elements of the plurality of classified data items and to reclassify each of the identified misclassified elements to generate a first plurality of reclassified data items; and
implement a first ensemble classifier that is configured to adjust the classifications of the elements of the plurality of classified data items in response to the first plurality of newly-classified data items and the first plurality of reclassified data items to generate the first ensemble classified data items.

17. The non-transitory computer-readable medium of claim 16, wherein the computer instructions configure the one or more processors to operate the second and third machine-learning classifiers in parallel.

* * * * *